C. R. Penfield,
Flower Pot.
No. 102,311.   Patented Apr. 26, 1870.
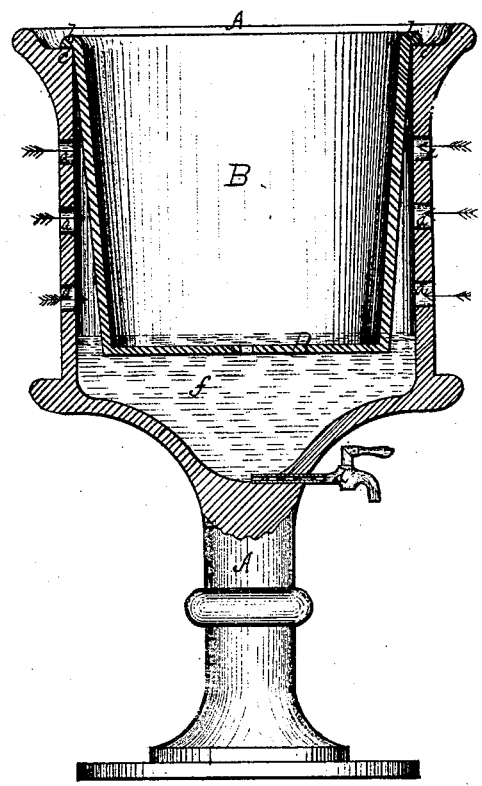
Witnesses:
J. R. Doane
C. N. Woodward
Chas. R. Penfield Inventor.
by
J. Fraser & Co.
Attys.

United States Patent Office.

CHARLES R. PENFIELD, OF LOCKPORT, NEW YORK.

Letters Patent No. 102,311, dated April 26, 1870.

IMPROVEMENT IN FLOWER-POTS.

The Schedule referred to in these Letters Patent and making part of the same.

*To all whom it may concern:*

Be it known that I, CHARLES R. PENFIELD, of Lockport, in the county of Niagara and State of New York, have invented certain Improvements in Flower-Pots, of which the following is a specification.

My invention consists in providing an urn or flower-pot holder, the bottom of which holds water, the sides being high enough to hide the ordinary soft earthenware crock, which is held suspended by a flange around the inside of the holder, and having a number of holes through the sides to allow a free circulation of air all around the crock.

In the drawing, the figure shows a vertical section of the flower-pot and urn.

A is the outside urn or holder, preferably made of metal, and, if desired, of an ornamental form, standing on its own pedestal, the whole formed in one or more pieces, and having a number of holes or perforations, *a a a a*, in its sides, which admit a free circulation of air around and under the earthenware crock B, which sits inside the urn, and is held suspended by a rim, *b*, which rests on a flange, *c*, formed on the inside edge of the urn.

The bottom of the urn is hollowed out, making a reservoir, *f*, to receive and hold the water that works through the crock, the bottom of which stands some little distance from the bottom of the urn.

A faucet, *d*, can be arranged in the bottom of the urn to draw off the water which accumulates from the flower-pot.

As is well known, soft earthen crocks are considered the most suitable for plants to grow in, as they retain moisture and absorb more or less nourishment from the atmosphere. The difficulty with them, however, is that being so porous, the water put in for the benefit of the plants runs out at the bottom or exudes from the sides. To do away with this trouble, I provide this outside durable holder, which will hold the water and yet not exclude the air from the pot, and protects it from damage, and which can be made in any ornamental manner, or painted according to taste.

When desired, the pot can be removed and set in the ground and the urn used for other purposes. Another advantage is, that, when necessary to water the plant from the bottom, enough water can be poured to rise through the hole in the bottom of the crock. Still another advantage is that earthenware does not heat and dry the plants, as is usual with metal pots.

I am acquainted with the patent of G. Gunther, June 13, 1865, for a flower-basket, having a detachable bottom; such is not, however, the equivalent of my invention.

I claim as my invention—

The earthenware pot B, suspended within the metal vase A, leaving an air-space around its sides, and a water space below it, in combination with openings *a*, communicating with said air-space, as herein set forth.

In witness whereof, I have hereunto signed my name in the presence of two subscribing witnesses.

CHAS R. PENFIELD.

Witnesses:
THOS. W. VAN VALKENBURG,
S. C. LEWIS.